United States Patent

Capp et al.

[15] 3,676,430
[45] July 11, 1972

[54] PRODUCTION OF CAPROLACTAM

[72] Inventors: Clifford William Capp, Ewell; Brian Walton Harris, Horley; Edwin George Edward Hawkins, Lower Kingswood, all of England

[73] Assignee: BP Chemicals (U.K.) Limited, Moor Lane, London, England

[22] Filed: May 8, 1968

[21] Appl. No.: 727,728

[30] Foreign Application Priority Data

June 2, 1967 Great Britain......................25,685/67

[52] U.S. Cl. ........................................260/239.3 A, 260/586
[51] Int. Cl. ..............................................C07d 41/06

[58] Field of Search.................................260/239.3

[56] References Cited

OTHER PUBLICATIONS

Derwent's "Belgian Patents Report" abstracting Belgian Patent 704,214, granted Sept. 22, 1967

*Primary Examiner*—Henry R. Jiles
*Assistant Examiner*—Robert T. Bond
*Attorney*—Jacobs & Jacobs

[57] ABSTRACT

Caprolactam is made by reacting 1,1'-peroxydicyclohexylamine with alkali metal methoxide dissolved in methanol at a concentration of at least 4 gram moles/liter.

9 Claims, No Drawings

PRODUCTION OF CAPROLACTAM

The present invention relates to a process for the production of lactams.

The production of lactams by reacting novel compounds viz. peroxydicycloalkylamines with alkali metal alkoxides, aryloxides or mixtures of alkali metal hydroxides with alkanols or aromatic hydroxy-compounds is described in Belgian Pat. No. 704,214. Processes for the production of the novel compounds used as starting materials in the process of Belgian Pat. No. 704,214 are described in Belgian Pat. No. 701,327.

We have now found that the process can be improved by suitable choice of reactant concentrations.

Accordingly the present invention is a process for the production of caprolactam which comprises reacting together 1,1'-peroxydicyclohexylamine with an alkali metal methoxide in solution in methanol at a concentration of at least 4 gram moles of alkali metal alkoxide per liter.

It has been found that with high concentration of alkali metal alkoxide, good yields of caprolactam are obtained together with reasonable recoveries of cyclohexanone.

1,1'-Peroxydicyclohexylamine and a process for its production is described in our Belgian Pat. No. 701,327 and is hereinafter referred to as peroxyamine.

Examples of specific alkali metal methoxides which may be used are those of sodium and potassium.

The methoxide may be formed as a solution by reacting, e.g. sodium or potassium with an excess of methanol which is the solvent in which the decomposition of the peroxyamine is carried out.

The peroxyamine and the alkali metal methoxide are reacted together in solution. They may be reacted together simply by being brought into contact.

The concentration of the alkali metal methoxide should be greater than 4 moles per liter of solvent. The maximum concentration which can be used will depend upon the solubility of the alkoxide in the solvent used. Examples of suitable concentrations are those greater than 5 moles and less than 8 moles, per liter of solvent. The concentration of the peroxyamine may vary over a moderately wide range for example from 0.1 to 5 moles of peroxyamine per liter of solvent and is preferably such as to give a molar ratio of alkali metal alkoxide to peroxyamine in the range of 80:1 to 1:1. The reaction may be carried out over a moderately wide range of temperatures for example at temperatures in the range 20°C to 150°C, preferably between 40'C and 100°C.

The duration of the reaction will depend upon the reaction conditions and will be decreased by an increase in reaction temperature, alkali metal methoxide concentrations or molar ratio of alkali metal methoxide to peroxyamine. The reaction is complete when no more peroxide can be detected in the reaction mixture. The presence of peroxide can be detected by reaction with potassium iodide, iodine being liberated. It is preferred to keep the reaction time short for best results and this is achieved by operating at the moderately elevated temperatures, e.g. 40°C to 100°C and moderately high molar ratios of methoxide to peroxyamine e.g. ratios of 20:1 to 1:1, in particular 10:1 to 1:1. The duration of the reaction is preferably such that the reaction goes substantially to completion. The reaction time may vary over a moderately wide range, for example between 5 minutes and 12 hours.

The reaction may be carried out over a moderately wide range of pressures including sub-atmospheric as well as super-atmospheric pressures. It can be carried out batchwise in, e.g. a stirred vessel or continuously for example in a stirred reactor, tower reactor, narrow bore tube reactor or other suitable type.

The caprolactam produced by the process of the present invention may be recovered in any suitable manner, e.g. by solvent extractions, distillation or a combination of these techniques.

The invention will now be illustrated further by the following examples, in which Example 2 is a comparative example not according to the invention.

EXAMPLE 1

A series of experiments — Runs 1 to 10 were carried out in which alkali metal alkoxide was dissolved in boiling methanol. The solution was allowed to cool and 1,1'-peroxydicyclohexylamine was added to the cold solution which was then heated at the reaction temperature with mixing, until the peroxide had reacted. Unreacted peroxide was determined by reaction with potassium iodide. The reaction mixture was then cooled, water was added and the reaction products extracted from the reaction mixture with chloroform and analyzed by gas-phase chromatography. The reaction conditions and the results obtained are given in the accompanying Tables 1 and 2. It should be noted that with respect to the yields quoted that 100 moles of 1,1'-peroxydicyclohexylamine can give a maximum total of 200 moles of $C_6$ compounds e.g., caprolactam and cyclohexanone.

EXAMPLE 2

The procedure of Example 1 was repeated for a further run — Run 11 in which only 2 gram moles of alkali metal alkoxide were used per liter of solvent. The results are given in Table 2 where they are compared with a run according to the invention using similar conditions except that 4 gram moles of alkali metal alkoxide per liter of solvent were used.

TABLE 1

| Run No. | Alkoxide | Alkoxide, gram-moles per litre methanol | Peroxyamine, gram-moles per litre methanol | Reaction temperature, °C | Reaction time, hours | Peroxyamine, unreacted percent of original charge | Yields mole/mole percent based on peroxyamine fed | |
|---|---|---|---|---|---|---|---|---|
| | | | | | | | Caprolactam | Cyclohexanone |
| 1 | NaOMe | 4.0 | 0.25 | 60 | 2.5 | 4.5 | 82 | 99 |
| 2 | NaOMe | 4.0 | 0.50 | 60 | 3.1 | 1.5 | 87 | 97 |
| 3 | NaOMe | 4.0 | 0.50 | 50 | 11 | 3.3 | 80 | 89 |
| 4 | NaOMe | 4.0 | 0.25 | 80 | 0.5 | 1.9 | 85 | 92 |
| 5 | NaOMe | 4.0 | 0.5 | 80 | 0.7 | 0.0 | 88 | 102 |
| 6 | NaOMe | 7.4 | 1.0 | 80 | 0.3 | 0.0 | 81 | 50 |
| 7 | NaOMe | 5.0 | 2.0 | 80 | 0.5 | 0.0 | 80 | 59 |
| 8 | NaOMe | 5.0 | 5.0 | 80 | 1.2 | 2.5 | 87 | 77 |
| 9 | KOMe | 3.7 | 0.50 | 58 | 3.0 | 0.0 | 81 | 85 |

TABLE 2

| Run No. | Alkoxide | Alkoxide, gram-moles per litre methanol | Peroxyamine, gram-moles per litre methanol | Reaction temperature, °C | Reaction time, hours | Peroxyamine, unreacted percent of original charge | Yields mole/mole percent based on peroxyamine | |
|---|---|---|---|---|---|---|---|---|
| | | | | | | | Caprolactam | Cyclohexanone |
| 10 | NaOMe | 4.0 | 1.0 | 80 | 0.8 | 0.0 | 90 | 99 |
| 11 | NaOMe | 2.0 | 1.0 | 80 | 4.7 | 2.1 | 73 | 102 |

We claim:
1. The process for the production of caprolactam which comprises reacting together 1,1'-peroxydicyclohexylamine and an alkali metal methoxide in solution in methanol at a ratio in the range of 80:1 to 1:1 alkali metal methoxide to 1,1'-peroxydicyclohexylamine at a concentration of at least 4 gram moles of alkali metal methoxide per liter of methanol at a temperature of from 20° C. to 150° C.

2. The process according to claim 1 wherein the concentration of alkali metal methoxide is greater than 5 and less than 8 moles/liter.

3. The process according to claim 1 wherein the methoxide is a sodium or potassium methoxide.

4. The process according to claim 1 wherein the mole ration of methoxide to 1,1'-peroxydicyclohexylamine is in the range of 20:1 to 1:1.

5. The process according to claim 4 wherein the molar ratio of methoxide to 1,1'-peroxydicyclohexylamine is in the range of 10:1 to 1:1.

6. The process according to claim 1 wherein the concentration of 1,1'-peroxydicyclohexylamine is in the range of 0.1 to 5 moles per liter of solvent.

7. The process according to claim 1 wherein the reaction is carried out at a temperature in the range of 40° C to 100° C.

8. The process according to claim 7 wherein the 1,1'-peroxydicyclohexylamine is reacted substantially completely.

9. The process according to claim 1 wherein the reactant time ranges from about 5 minutes to about 12 hours.

* * * * *